United States Patent [19]
Tani et al.

[11] Patent Number: 5,675,479
[45] Date of Patent: Oct. 7, 1997

[54] SWITCHING POWER-SUPPLY

[75] Inventors: Ryota Tani; Kohji Nakahira, both of Nagaokakyo, Japan

[73] Assignee: Murata Manufacturing Co., Ltd., Japan

[21] Appl. No.: 686,323

[22] Filed: Jul. 25, 1996

[30] Foreign Application Priority Data

Jul. 27, 1995 [JP] Japan ............... 7-192074

[51] Int. Cl.⁶ ............................................. G05F 1/618
[52] U.S. Cl. ................................................. 363/19
[58] Field of Search ............... 363/16–21; 323/282–289, 323/259–261, 271–275, 284

[56] References Cited

U.S. PATENT DOCUMENTS

| 5,353,213 | 10/1994 | Paulik et al. | 363/19 |
|---|---|---|---|
| 5,390,100 | 2/1995 | Palata | 363/19 |

*Primary Examiner*—Aditya Krishnan
*Attorney, Agent, or Firm*—Ostrolenk, Faber, Gerb & Soffen, LLP

[57] ABSTRACT

When the disclosed switching power supply is lightly loaded, efficiency is improved by lowering the switching frequency of a switching element. When its load is heavy, ripple noise of the output voltage is reduced by heightening the switching frequency of the switching element, and transient response is improved. The switching power-supply employs an RCC method and also includes an oscillation frequency inhibit circuit for inhibiting an oscillation frequency, and an operation switching circuit for starting or stopping the operation of the oscillation frequency inhibit circuit. By applying a signal voltage to the operation switching circuit, the operation of the oscillation frequency inhibit circuit is turned on while a load is light and turned off while a load is heavy, and a normal RCC oscillation operation is performed.

3 Claims, 5 Drawing Sheets

SWITCHING POWER-SUPPLY

BACKGROUND OF THE INVENTION

1. Field of the Invention

The present invention relates to a switching power-supply employing a ringing choke converter (RCC) method.

2. Description of the Related Art

A conventional switching power-supply employing a ringing choke converter method, which is currently in use, is shown in FIG. 8. Referring to FIG. 8, reference character T denotes a transformer having a primary main winding N1, a secondary output winding N2, and a feedback winding N3. A rectifier diode D1 and a smoothing capacitor C1 constitute the primary DC power-supply. The negative (−) terminal of this primary DC power-supply is connected to the winding end of the feedback winding N3, forming a common ground GND for the input side.

The positive (+) terminal of the primary DC power-supply is connected to the ground GND via a path from the winding beginning of the primary main winding N1 to the winding end thereof, and via a path from the drain to the source of a switching element Q1. Further, a series circuit of a starting resistor R1 and a bias resistor R2 is connected between the positive (+) terminal and the negative (−) terminal of the primary DC power-supply, with the connection point of the starting resistor R1 and the bias resistor R2 being connected to the gate of the switching element Q1. Further, the gate of the switching element Q1 is connected to the winding beginning of the feedback winding N3 via a capacitor C3 and a resistor R3. Further, the gate of the switching element Q1 is connected to the ground GND via a path from a collector to an emitter of an NPN-type control transistor TR1 serving as a control element. A time-constant capacitor C4 and a discharge resistor R4 are connected in parallel between the base of the NPN-type control transistor TR1 and the ground GRD.

An oscillation stabilization circuit 1 comprising a series circuit of a diode D3 and a capacitor C5 is connected between the winding beginning of the feedback winding N3 and the ground. In this case, the cathode of the diode D3 is connected to the winding beginning of the feedback winding N3. Further, an output stabilization circuit 2 comprising a series circuit of a diode D4, resistor R5 and a phototransistor PT1 is connected between the winding beginning of the feedback winding N3 and the base of the transistor TR1. In this case, the anode of the diode D4 is connected to the winding beginning of the feedback winding N3, and the emitter of the phototransistor PT1 is connected to the base of the transistor TR1. An overcurrent protection circuit 3 is connected between the cathode of the diode D4 and the base of the transistor TR1. The overcurrent protection circuit 3 comprises a parallel circuit of a resistor R7 and the series circuit of a resistor R6 and a Zener diode Dz1. In this case, the anode of the Zener diode Dz1 is connected to the base of the transistor TR1. Further, the connection point of the diode D3 and the capacitor C5 is connected to the base of the transistor TR1 via a resistor RS.

Next, a rectifier diode D2 and a smoothing capacitor C2 constitute a secondary DC power-supply. An output voltage detection circuit 4 comprising two series circuits connected in parallel is connected between the positive (+) terminal and the negative (−) terminal of the secondary DC power-supply. The first series circuit is formed of a resistor R9, a photo-diode PD1 and a shunt regulator Sr. The second series circuit is formed of a resistor R10 and a resistor R11. Furthermore, in the output voltage detection circuit 4, a reference terminal of the shunt regulator Sr is connected to the connection point of the resistor R10 and the resistor R11.

Next, the operation of the conventional switching power-supply circuit having the above-described circuit components will be described below. When the primary DC power-supply is started, the switching element Q1 conducts via the primary main winding N1 and the starting resistor R1. Then, a voltage is induced in the feedback winding N3 by magnetic induction with the winding beginning thereof being positive, and the induced voltage causes the capacitor C4 to begin to be charged through the diode D4, the resistor R7 and the like. When the charged voltage of the capacitor C4 reaches a threshold voltage, the transistor TR1 conducts, causing the switching element Q1 to be turned off. When the switching element Q1 is turned off, a counter electromotive force is generated in the primary main winding N1, such counter electromotive force causing an electromotive force to be induced in the secondary output winding N2. This induced electromotive force is rectified and smoothed by the diode D2 and the capacitor C2 into a secondary DC power-supply, and an output voltage Vo is supplied to a load. Then, when the electric-charge of the capacitor C4 is discharged through a discharge circuit, such as the resistor R4, and its charged voltage reaches below the threshold voltage, the transistor TR1 is turned off. Then, when the counter electromotive force of the secondary output winding N2 and the feedback winding N3 is not present, a kick voltage is generated in the feedback winding N3 with the winding beginning being positive, such kick voltage causing the switching element Q1 to be turned on again, and the switching power-supply circuit returns to the original state. The same operations as described above are performed again. Thus, and an oscillation operation is performed. This oscillation operation reaches a steady state.

Next, a description of feedback control from the output circuit side will be given. If the output voltage Vo increases, for example, the electrical potential (the electrical potential of the connection point of the resistor R10 and the resistor R11) of the reference terminal of the shunt regulator Sr is also increased. The internal resistance of the shunt regulator Sr is decreased by error amplification in comparison with the reference voltage, a large electric current flows through the photodiode PD1, and thus a large electric current is also caused to flow through the phototransistor PT1 which is photocoupled with such photodiode PD1. Then, the current which flows through such phototransistor PT1 causes the capacitor C4 to begin to be charged with a predetermined charging time constant, causing the control transistor TR1 to be turned on quickly. Thereupon, the switching element Q1 is turned off earlier than normal, which decreases the output voltage Vo of the secondary DC power-supply P2 and maintains it at a predetermined voltage.

When the output voltage Vo decreases, on the other hand, operations reverse to the above operations are performed, and the output voltage Vo is increased and maintained at a predetermined voltage.

Generally the output voltage Vo increases when its load is light and decreases when its load is heavy.

However, in the conventional RCC-method switching power-supply, as shown in FIG. 8, when the input power (load) is small, its oscillation frequency becomes high, and efficiency becomes poor.

SUMMARY OF THE INVENTION

Accordingly, it is an object of the present invention to improve efficiency by lowering the switching frequency of the switching element during a light load time, to decrease ripple noise of the output voltage by heightening the switching frequency of the switching element during a heavy load time, and to improve transient response.

To achieve the above-described object, according to one aspect of the present invention, there is provided a switching power-supply employing an RCC method, comprising: a transformer including a primary main winding, a secondary output winding and a feedback winding; a switching element, which is connected in series with the primary main winding in a primary DC power-supply and whose control terminal is connected to one end of the feedback winding; a first control element which is connected to a control terminal of the switching element; an output stabilization circuit and an overcurrent protection circuit both of which are connected between the control terminal of the first control element and the feedback winding; a secondary DC power-supply obtained by rectifying and smoothing the output of the secondary DC power-supply; and an output voltage detection circuit connected to the secondary DC power-supply, wherein there is provided an oscillation frequency inhibit circuit having a second control element for controlling the switching frequency of the switching element so that it does not reach above a predetermined frequency, and an operation switching circuit for starting the operation of the oscillation frequency inhibit circuit in accordance with a light load signal, and for stopping the operation of the oscillation frequency inhibit circuit in accordance with a heavy load signal.

According to another aspect of the present invention, there is provided a switching power-supply, wherein in the operation switching circuit, the light load signal or the heavy load signal is applied to a photodiode, and the operation of the oscillation frequency inhibit circuit having a second control element is started or stopped in accordance with the change in the impedance of a phototransistor which is photocoupled to the photodiode.

According to a further aspect of the present invention, there is provided a switching power-supply, wherein in the operation switching circuit, the light load signal or the heavy load signal is applied to a photodiode, and the operation of the oscillation frequency inhibit circuit having a second control element is started or stopped by short-circuiting or opening a charging circuit of a bias capacitor of a second control element in the oscillation frequency inhibit circuit in accordance with the change in the impedance of a phototransistor which is photocoupled to the photodiode.

In the present invention, since an oscillation frequency inhibit circuit for lowering the switching (oscillation) frequency of a switching element, and an operation switching circuit for starting or stopping the operation of this oscillation frequency inhibit circuit are provided in a normal RCC circuit, control of a low frequency oscillation operation is performed from the oscillation frequency inhibit circuit by applying a light load signal voltage to the operation switching circuit during a shift to a light load, such as standby, and control of a normal RCC operation is performed by the oscillation frequency inhibit circuit by applying a heavy load signal voltage to the operation switching circuit during a shift to a heavy load.

Further, in the present invention, since the operation of the oscillation frequency inhibit circuit having a second control element is started or stopped in accordance with the change in the impedance of the phototransistor which is photocoupled to the photodiode in accordance with a light load signal or a heavy load signal which is applied to a photodiode of the operation switching circuit, the oscillation frequency of the switching element is controlled to perform a low frequency oscillation operation or a normal RCC oscillation operation.

Further, in the present invention, since the operation of the oscillation frequency inhibit circuit having a second control element is started or stopped by short-circuiting or opening a bias charging circuit of the second control element of the oscillation frequency inhibit circuit in accordance with the change of the impedance of the phototransistor, the oscillation frequency of the switching element is controlled to perform a low frequency oscillation operation or a normal RCC oscillation operation.

The above and further objects, aspects and novel features of the invention will become more apparent from the following detailed description when read in connection with the accompanying drawings.

DESCRIPTION OF PREFERRED EMBODIMENTS

Figure 1:
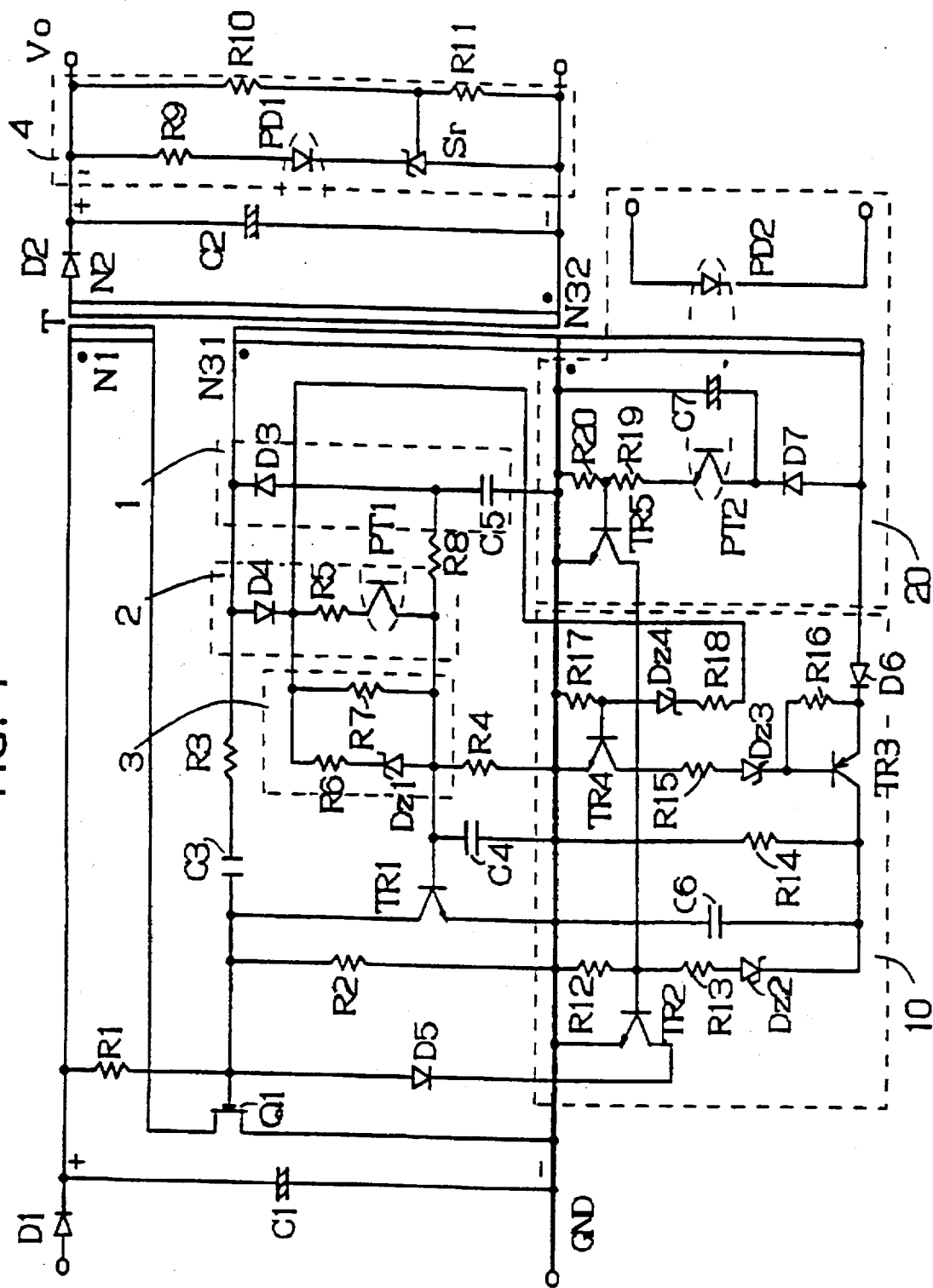
FIG. 1 is a circuit diagram of a first embodiment of a switching power-supply of the present invention.
Figure 8:
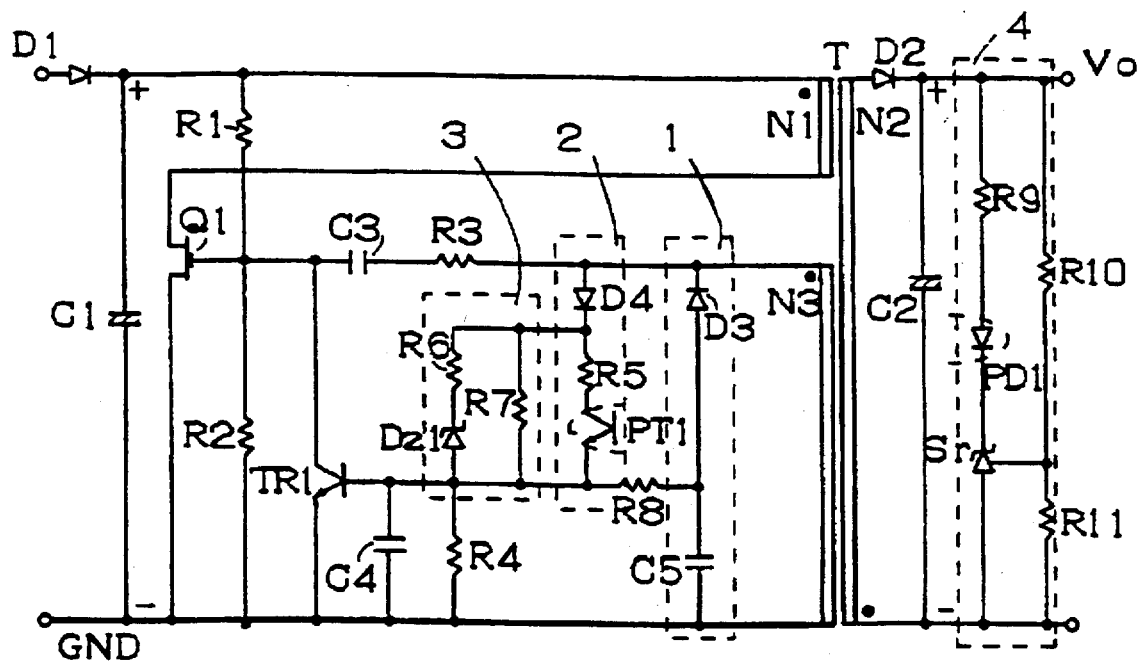
FIG. 8 is a circuit diagram of a conventional switching power-supply employing an RCC method.

A first embodiment of the present invention will be described below with reference to FIG. 1. This embodiment is concerned with improvements in the conventional switching power-supply shown in FIG. 8. Therefore, components in FIG. 1 which are the same as those in FIG. 8 are given the same reference numerals, and a description thereof is omitted. The feedback winding N3 of the transformer T in the prior art is replaced by a feedback winding with a midpoint tap in this embodiment. Thus, the feedback winding N3 in the prior art is replaced by a first feedback winding N31, and a second feedback winding N32 is added in this embodiment. And, this midpoint tap becomes a common ground on the input circuit side and becomes also the winding beginning of the second feedback winding N32. Further, the transistor TR1 in FIG. 8 will now be referred to as a first control transistor TR1 which constitutes a first control element in this embodiment.

In the circuit of this embodiment, there is provided an oscillation frequency inhibit circuit 10, and an operation switching circuit 20 for starting or stopping the operation of the oscillation frequency inhibit circuit 10.

The circuitry of the oscillation frequency inhibit circuit 10 will be described first. In a second NPN-control transistor TR2 serving as a second control element, the emitter is connected to the ground GND, and the collector is connected to the gate of the switching element Q1 via a path from the cathode to the anode of the diode D5.

A series circuit of a Zener diode Dz2, a resistor R13 and a resistor R12, and a parallel circuit with a capacitor C6 and a resistor R14 are connected between a collector of a transistor TR3 and the ground GRD. This parallel circuit constitutes a time-constant circuit. The connection point of the resistor R12 and the resistor R13 is connected to the base of the transistor TR2. The base of the transistor TR3 is connected to the ground GND via a path from the cathode to the anode of a Zener diode Dz3, the resistor R15, and a path from the collector to the emitter of a transistor TR4. Further, a bias resistor R16 is connected between the emitter and the base of the transistor TR3. Furthermore, the emitter of the transistor TR3 is connected to the winding end of the second feedback winding N32 via a path from the cathode to the anode of a diode D6.

Further, a bias resistor R17 is connected between the base of the transistor TR4 and the ground GND. In addition, the base of the transistor TR4 is connected to the cathode of the diode D4 via a path from the anode to the cathode of a Zener diode Dz4 and a resistor R18. The circuit of the transistors TR3 and TR4 constitutes a charging circuit of a bias capacitor C6 of the second control transistor TR2.

Next, the operation switching circuit 20 for starting or stopping the operation of the oscillation frequency inhibit circuit 10 will be described. The winding end of the feedback winding N32 is connected to the ground GND via a path from the anode to the cathode of a diode D7, a path from the collector to the emitter of the phototransistor PT2, and bias resistors R19 and R20. Further, the cathode of the diode D7 is connected to the ground GND via the capacitor C7, and the base of a transistor TR5 is connected to the connection point of the resistors R19 and R20. The collector of the transistor TR5 is connected to the base of the second control transistor TR2 of the oscillation frequency inhibit circuit 10. The phototransistor PT2 is photocoupled to the photodiode PD2.

Figure 7:
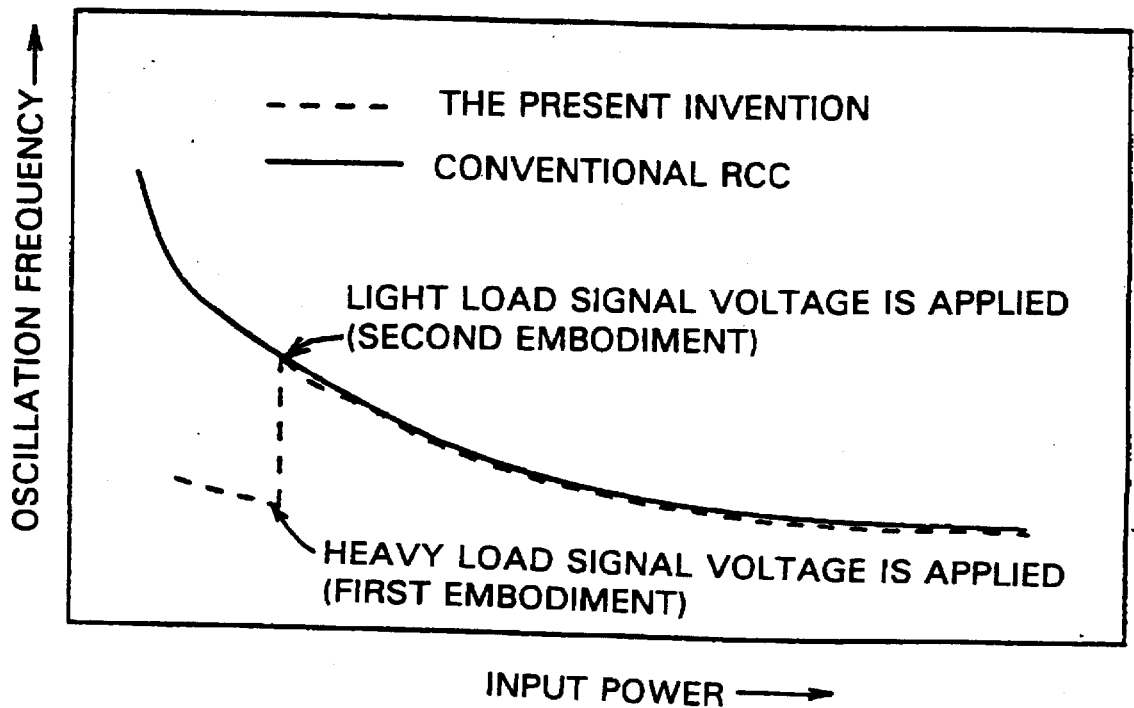
FIG. 7 is an oscillation frequency characteristic diagram with respect to an input power.

Next, the operation of the circuit of this embodiment having the above-described construction will be described. The circuit comprises a normal RCC circuit comprising the primary main winding N1, the secondary output winding N2, the feedback winding N31, the switching element Q1, the first control transistor TR1, and the output voltage detection circuit 4. This circuit performs a normal RCC oscillation operation by the interactions of said components. In this normal RCC oscillation operation, as shown by the solid line in FIG. 7, when the input power (the output power, the load) is large, the switching frequency of the switching element Q1 is low; however, when the input power (the output power, the load) is small, the oscillation frequency becomes high.

However, the embodiment further comprises the oscillation frequency inhibit circuit 10 which is added to the conventional RCC circuit. With this circuit, when the input power is small, that is, the output power and the load are also small, and the switching element Q1 is turned on, a positive voltage is generated at the winding beginning of the feedback winding N31. This positive voltage causes a current to flow through the diode D4, the resistor R18, the Zener diode Dz4 and the resistor R17, causing the transistor TR4 to be turned on. However, since the winding end of the feedback winding N32 is negative, no current flows through the transistors TR3 and TR4.

However, when the switching element Q1 is turned off as a result of the turning on of the first control transistor TR1 as described above, the winding beginning of the feedback winding N31 becomes negative, which applies a reverse bias to the base of the transistor TR4, and the transistor TR4 begins to be turned off. However, there is a time lag until the transistor TR4 is completely turned off, and the winding end of the feedback winding N32 is positive. Therefore, an electric current flows momentarily through the transistors TR3 and TR4, causing the capacitor C6 to be charged. The voltage due to this charge causes the transistor TR2 to be turned on and keeps the switching element Q1 turned off. Since the switching element Q1 is kept off, its oscillation period becomes long, and its oscillation frequency becomes low. That is, the switching element Q1 is turned off by the first control transistor TR1, its off time is continued by the second control transistor TR2, and its oscillation frequency is kept low. With this oscillation frequency inhibit circuit 10 operating, as described above, the oscillation frequency is kept low, and efficiency is improved when the input power is small, such as during standby, namely, at a time when the load is light.

Next, a case in which the oscillation frequency inhibit circuit 10 is not operated will be described. By applying a heavy load signal voltage to the photodiode PD2 of the operation switching circuit 20, an electric current is made to flow through the phototransistor PT2 circuit which is photocoupled to the photodiode PD2. Thereupon, the transistor TR5 is turned on, and the second control transistor TR2 is turned off. When this second control transistor TR2 is turned off, the oscillation frequency inhibiting operation cannot be performed. As shown by the broken line in FIG. 7, the operation of the oscillation frequency inhibit circuit 10 is stopped at a given input power, and the switching power-supply returns to the normal RCC operation indicated by the solid line. The operation switching circuit 20 in this embodiment serves to stop the operation of the oscillation frequency inhibit circuit 10 by applying a heavy load signal voltage and to shift from a light load, such as standby, to a heavy load.

In the circuit of this embodiment, in order to shift from a light load to a heavy load, the transistor TR5 is turned on by applying a heavy load signal voltage. However, in order to shift from a heavy load to a light load in this circuit, it is possible to release the heavy load signal voltage, causing the transistor TR5 to be turned off.

Next, a circuit of a second embodiment of the invention will be described with reference to FIG. 2. As compared with the circuit of the first embodiment, in this circuit of the second embodiment, the circuitry of the operation switching circuit 20 is changed. With this circuit, when a shift is made from a heavy load to a light load, the oscillation frequency inhibit circuit 10 is operated (the stoppage of its operation is released) to shift to a light load mode and to lower the switching frequency of the switching element Q1.

Figure 2:
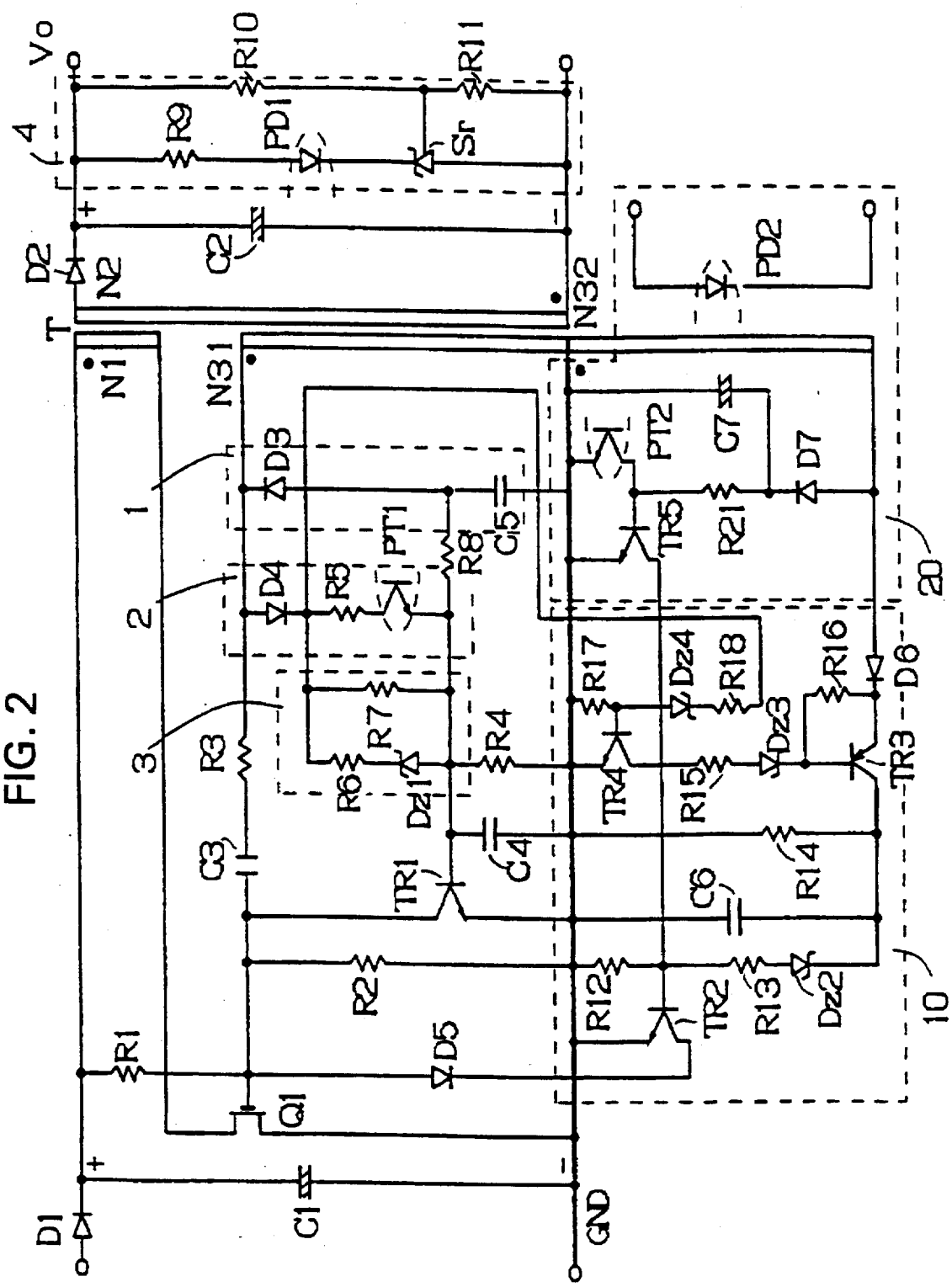
FIG. 2 is a circuit diagram of a second embodiment of a switching power-supply of the present invention.

Referring to FIG. 2, the base of the transistor TR5 is connected to the collector of the phototransistor PT2, and the emitter of the phototransistor PT2 is connected to the ground GND. The connection point of the base of the transistor TR5 and the collector of the phototransistor PT2 is connected to the winding end of the feedback winding N32 via the resistor R21 and a path from the cathode to the anode of the diode D7. Further, a capacitor C7 is connected between the connection point of the cathode of the diode D7 and the resistor R21, and the ground GND.

Next, the operation of the circuit of this embodiment will be described. When the circuit of this embodiment is operating at a heavy load in which an input power is large, a light load signal voltage is applied to the photodiode PD2 in order to shift to a light load mode, such as a standby mode. Thereupon, the phototransistor PT2 is turned on, the transistor TR5 is turned off, and the second control transistor TR2 of the oscillation frequency inhibit circuit 10 begins to operate. Thus, as described above, the switching frequency of the switching element Q1 is kept low, and efficiency is improved.

In the circuit of this embodiment, in order to shift from a heavy load to a light load, the transistor TR5 is turned off by applying a light load signal voltage. However, in order to return to the original heavy load from the light load, it is possible to turn on the transistor TR5 by releasing the light load signal voltage.

Figure 3:
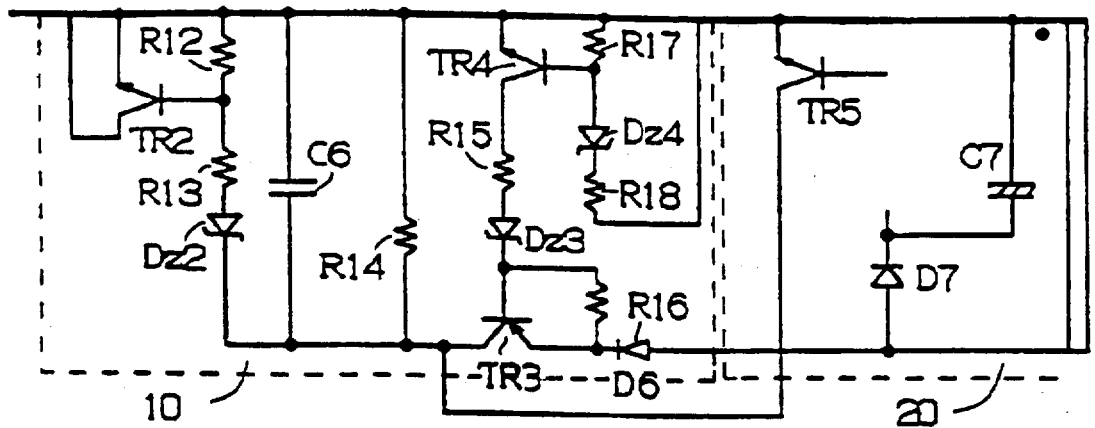
FIG. 3 shows a first modification of transistors of an operation switching circuit in the first embodiment of the present invention.

FIG. 3 shows a modification of the connection of the collector of the transistor TR5 of the operation switching circuit 20, in which the collector of the transistor TR5 is connected to the collector of the transistor TR3. In the case corresponding to the first embodiment, the transistor TR5 is turned on by the heavy load signal voltage, the charging circuit of the transistors TR3 and TR4 for charging the bias capacitor C6 is short-circuited, the transistor TR2 of the oscillation frequency inhibit circuit 10 is turned off, and the normal RCC operation is performed. Further, in the case corresponding to the second embodiment, the transistor TR5 is turned off by the light load signal voltage, the charging circuit of the transistors TR3 and TR4 operates normally and charges the bias capacitor C6, the transistor TR2 of the oscillation frequency inhibit circuit 10 is turned on, and thus the switching frequency of the switching element Q1 is kept low.

Figure 4:
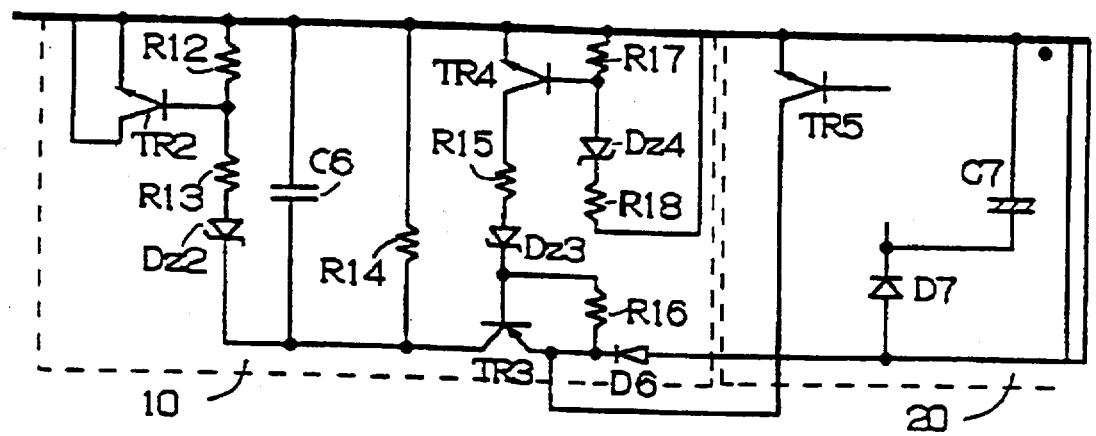
FIG. 4 shows a second modification of transistors of an operation switching circuit in the first embodiment of the present invention.

FIG. 4 shows a circuit in which the collector of the transistor TR5 is connected to the emitter of the transistor TR3. The operation of this circuit is the same as that in FIG. 3.

Figure 5:
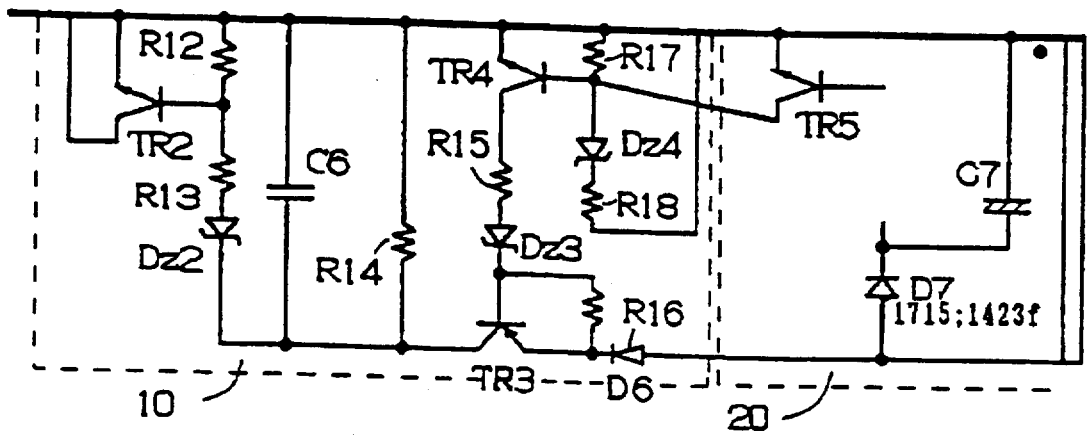
FIG. 5 shows a third modification of transistors of an operation switching circuit in the first embodiment of the present invention.

FIG. 5 shows a circuit in which the collector of the transistor TR5 is connected to the base of the transistor TR4. The operation of this circuit is the same as that in FIG. 3.

Figure 6:
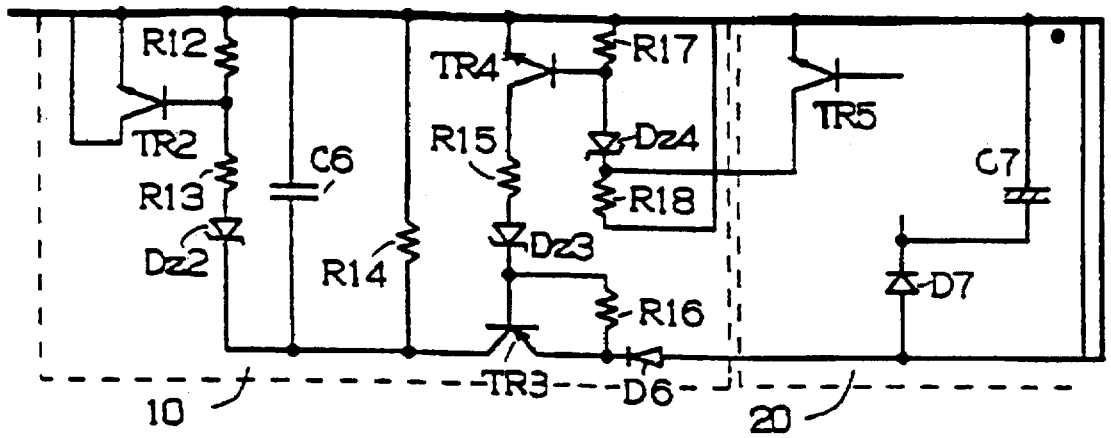
FIG. 6 shows a fourth modification of transistors of an operation switching circuit in the first embodiment of the present invention.

FIG. 6 shows a circuit in which the collector of the transistor TR5 is connected to the connection point of the resistor R18 and the Zener diode Dz4. The operation of this circuit is the same as that in FIG. 3.

In the present invention, since the oscillation frequency inhibit circuit is operated by applying a light load signal voltage or by releasing a heavy load signal voltage when a shift to a light load mode is made, the switching frequency of the switching element is lowered, and efficiency is improved. Further, when a shift to a heavy load mode is made, the operation of the oscillation frequency inhibit circuit is stopped by applying a heavy load signal voltage or by releasing a light load signal voltage in order to return to the normal RCC operation, and thus the switching frequency of the switching element is heightened. Thus, ripple noise of the output voltage is reduced, and transient response is improved.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A switching power-supply, comprising:

a transformer including a primary main winding, a secondary output winding and a feedback winding;

a switching element, which is connected in series with said primary main winding in a primary DC power-supply and having a control terminal which is connected to one end of said feedback winding;

a first control element which is connected to a control terminal of said switching element;

an output stabilization circuit which is connected between the control terminal of said first control element and said feedback winding;

an overcurrent protection circuit which is connected between the control terminal of said first control element and said feedback winding;

a secondary DC power-supply and a circuit for rectifying and smoothing the output of said secondary DC power-supply;

an output voltage detection circuit connected to said secondary DC power-supply;

an oscillation frequency inhibit circuit having a second control element for controlling a switching frequency of said switching element so that it does not exceed a predetermined frequency; and an operation switching circuit for causing said oscillation frequency inhibit circuit to operate in response to a light load signal, and for causing said oscillation frequency inhibit circuit to stop operating in response to a heavy load signal.

2. A switching power-supply according to claim 1, wherein said operation switching circuit comprises a phototransistor and a photodiode which are photocoupled to each other, at least one of said light load signal and said heavy load signal is applied to said photodiode, and the operation of said oscillation frequency inhibit circuit is started or stopped in accordance with a change in the impedance of said phototransistor.

3. A switching power-supply according to claim 1, wherein said operation switching circuit comprises a phototransistor and a photodiode which are photocoupled to each other, at least one of said light load signal and said heavy load signal is applied to said photodiode, and the operation of said oscillation frequency inhibit circuit is started or stopped by short-circuiting or opening a charging circuit of a bias capacitor of the second control element in response to a change in the impedance of said phototransistor.

* * * * *